US012152212B2

(12) United States Patent
Zuo et al.

(10) Patent No.: US 12,152,212 B2
(45) Date of Patent: Nov. 26, 2024

(54) METHOD FOR RECYCLING COAL LIQUEFACTION RESIDUE

(71) Applicant: University of Science and Technology Beijing, Beijing (CN)

(72) Inventors: Haibin Zuo, Beijing (CN); Yajie Wang, Beijing (CN)

(73) Assignee: University of Science and Technology Beijing (CN)

(*) Notice: Subject to any disclaimer, the term of this patent is extended or adjusted under 35 U.S.C. 154(b) by 158 days.

(21) Appl. No.: 17/806,914

(22) Filed: Jun. 14, 2022

(65) Prior Publication Data

US 2023/0110950 A1 Apr. 13, 2023

(30) Foreign Application Priority Data

Oct. 13, 2021 (CN) .......................... 202111193670.6

(51) Int. Cl.
| | |
|---|---|
| *C10L 5/48* | (2006.01) |
| *C04B 33/04* | (2006.01) |
| *C04B 33/135* | (2006.01) |
| *C04B 33/32* | (2006.01) |
| *C04B 35/626* | (2006.01) |
| *C10L 5/08* | (2006.01) |
| *C10L 5/36* | (2006.01) |

(52) U.S. Cl.
CPC ................ *C10L 5/48* (2013.01); *C04B 33/04* (2013.01); *C04B 33/1355* (2013.01); *C04B 33/32* (2013.01); *C04B 35/62695* (2013.01); *C10L 5/08* (2013.01); *C10L 5/361* (2013.01); *C04B 2235/3217* (2013.01); *C04B 2235/349* (2013.01); *C04B 2235/6567* (2013.01); *C04B 2235/661* (2013.01); *C10L 2270/08* (2013.01); *C10L 2290/06* (2013.01); *C10L 2290/24* (2013.01); *C10L 2290/30* (2013.01); *C10L 2290/32* (2013.01)

(58) Field of Classification Search
CPC .... C10L 5/48; C10L 5/08; C10L 5/361; C10L 2270/08; C10L 2290/06; C10L 2290/24; C10L 2290/30; C10L 2290/32; C04B 33/04; C04B 33/1355; C04B 33/32; C04B 35/62695; C04B 2235/3217; C04B 2235/349; C04B 2235/6567; C04B 2235/661
See application file for complete search history.

(56) References Cited

FOREIGN PATENT DOCUMENTS

| CN | 102925178 A | * | 2/2013 |
| CN | 103436280 A | * | 12/2013 |
| CN | 105906176 A | * | 8/2016 |

* cited by examiner

*Primary Examiner* — Latosha Hines
(74) *Attorney, Agent, or Firm* — C. Tumey Law Group PLLC

(57) ABSTRACT

Disclosed is a method for recycling a coal liquefaction residue. The method includes S1, drying a coal liquefaction residue and pulverizing to obtain a pulverized coal liquefaction residue; S2, subjecting the pulverized coal liquefaction residue to a solvothermal extraction in an autoclave to obtain an extract liquid and a residue; S3, distilling the extract liquid and recovering an organic solvent to obtain a solid extract.

9 Claims, 1 Drawing Sheet

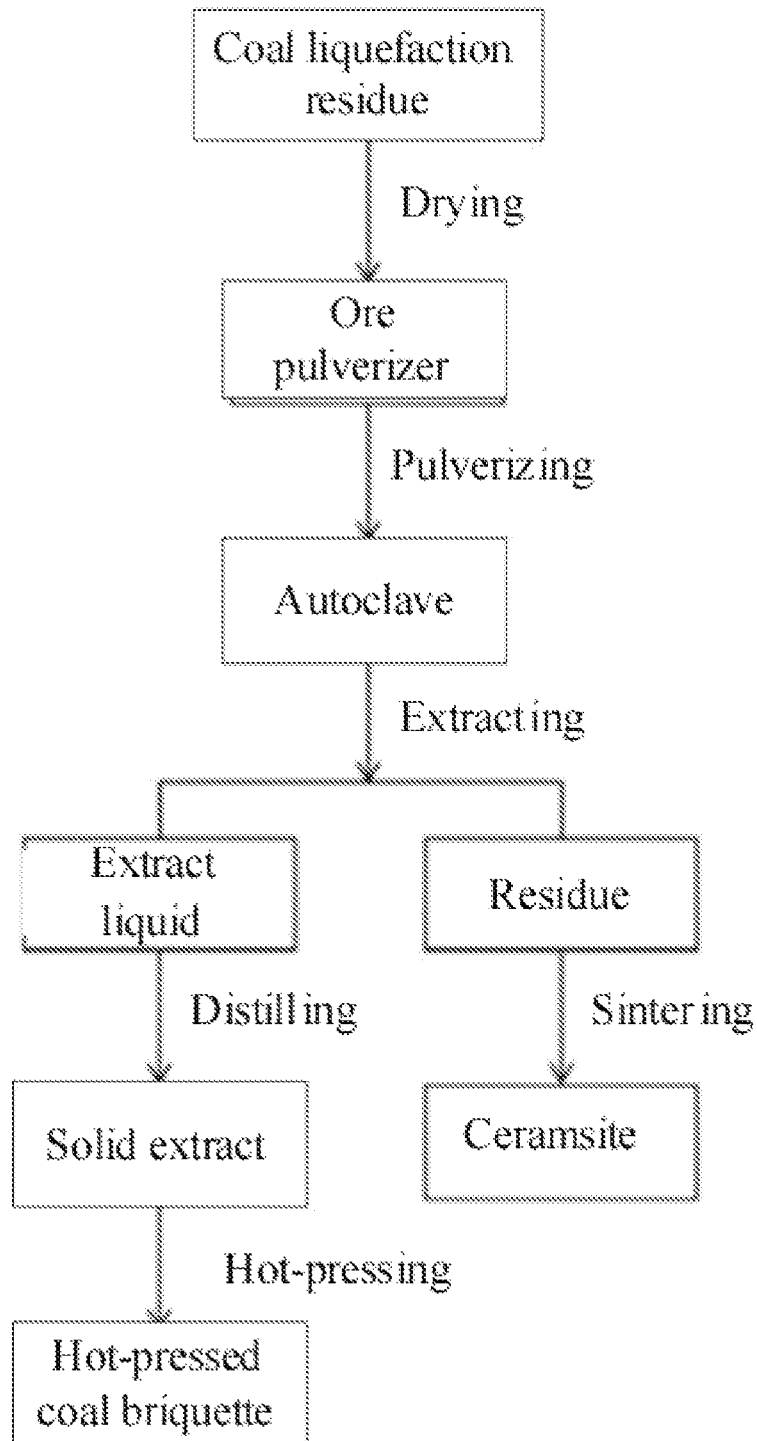

METHOD FOR RECYCLING COAL LIQUEFACTION RESIDUE

CROSS REFERENCE TO RELATED APPLICATION

This patent application claims the benefit of and priority to Chinese Patent Application No. 202111193670.6, filed on Oct. 13, 2021, the disclosure of which is expressly incorporated by reference herein in its entirety as part of the present application.

TECHNICAL FIELD

The present disclosure relates to the technical field of chemical engineering of coal, and in particular to a method for recycling a coal liquefaction residue.

BACKGROUND ART

China is rich in coal but poor in oil and gas. By using a coal-to-liquid technology, China could get rid of the dependence on imported crude oil and petroleum products, thus improving energy security. The coal-to-liquid technology is used for producing oil products and petrochemical products by using coal as a raw material through chemical processing, and includes direct coal liquefaction and an indirect coal liquefaction. Compared with the indirect coal liquefaction, the direct coal liquefaction has higher thermal efficiency and liquid product yield. Therefore, the direct coal liquefaction has been widely concerned and studied. According to the direct coal liquefaction, suitable coal is ground into a fine powder first, and then directly converted into a liquid fuel through a catalytic hydrogenation reaction under a high temperature and high pressure condition. During conversion, hydrogenation and depolymerization are conducted on a slurry system containing pulverized coal, a solvent and a catalyst. The liquid fuel is then refined to obtain high-quality gasoline, diesel oil, and an aviation fuel. At present, a direct coal liquefaction process has been developed by Shenhua Group, China with independent intellectual property rights, being a first industrialized device for the direct coal liquefaction in the world, which has been officially used for commercial production in 2011.

However, during the direct coal liquefaction, a large amount of direct coal liquefaction residue, also known as coal liquefaction residue, is produced. The coal liquefaction residue mainly consists of asphaltenes, pre-asphaltenes, and inorganic minerals, and has a solid content of about 50%, a softening point of about 160° C. and a calorific value of about 7,000 kcal. According to statistics, about 600,000 tons of the coal liquefaction residue is produced when every 1 million tons of oil products are produced. With rapid development of the direct coal liquefaction and continuous improvement of production capacity, the amount of the coal liquefaction residue produced has been also gradually increased. The asphaltenes in the coal liquefaction residue belong to coal tar asphaltenes, which contain a large number of polycyclic aromatic hydrocarbons, and exhibit high carcinogenicity. When the asphaltenes are disposed improperly, great harm will be caused to human body and the environment. However, the coal liquefaction residue is also a valuable energy source with a high calorific value and a high content of an organic compound. Therefore, rational disposal and utilization of the coal liquefaction residue are of great significance to economy and environmental protection. According to a common disposal method, the coal liquefaction residue is directly used as a raw material of fuels, a raw material in coal blending for coking, a raw material in pyrolysis, a raw material in gasification and a raw material of carbon materials. However, due to a high viscosity and a high mineral content, especially a high sulfur content, the utilization rate of the coal liquefaction residue is limited.

A solvent extraction method is a simple operation method to separate oil from slag. According to the method, based on the mechanism of mutual dissolution of organic component (s) in the coal liquefaction residue and an extraction solvent, an oil-containing waste residue and the solvent are mixed in a required ratio to achieve complete mixing and dissolution. Then, filtration, centrifugation or sedimentation is conducted to achieve the purpose of separating the oil from the slag. An extraction-separation method has the characteristics of high efficiency, high cost-effectiveness and large disposal capacity. However, there are few studies on a solvent extraction technology, and the key to the solvent extraction technology is to find a green solvent with high cost-effectiveness and low energy consumption.

SUMMARY

An object of the present disclosure is to provide a method for recycling a coal liquefaction residue so as to overcome at least one of deficiencies of the prior art. The method enables that the problems of difficult disposal and low utilization efficiency of the coal liquefaction residue could be solved. The method has the advantages of simple operation, high disposal efficiency of the coal liquefaction residue, and high added value of a product.

The present disclosure adopts the following technical solutions.

Disclosed is a method for recycling a coal liquefaction residue, comprising
  S1, drying a coal liquefaction residue and pulverizing to obtain a pulverized coal liquefaction residue, the coal liquefaction residue being a waste residue produced in a direct coal liquefaction process;
  S2, subjecting the pulverized coal liquefaction residue to a solvothermal extraction in an autoclave to obtain an extract liquid and a residue; and
  S3, distilling the extract liquid and recovering an organic solvent, to obtain a solid extract.

Based on any one of the possible implementations described above, embodiments are further provided as follows.

In some embodiments, the method further includes:
  S4, preparing a hot-pressed coal briquette by using the solid extract obtained in step S3 as a binder; and
  S5, preparing a ceramsite by using the residue obtained in step S2 as a raw material.

Based on any one of the possible implementations described above, embodiments are further provided as follows. In step S2, a solvent for the solvothermal extraction is N-methylpyrrolidone, and the solvothermal extraction is conducted at a temperature of 300-400° C. for 0.5-1.5 h.

Based on any one of the possible implementations described above, embodiments are further provided as follows. In step S1, the coal liquefaction residue is dried at a temperature of 80-120° C. and pulverized to a particle size of less than or equal to 0.2 mm.

Based on any one of the possible implementations described above, embodiments are further provided as follows. In step S3, the distilling is conducted at a temperature of 80-110° C. and a vacuum degree of less than or equal to 0.05 Mpa.

Based on any one of the possible implementations described above, embodiments are further provided as follows. In step S4, preparing a hot-pressed coal briquette by using the solid extract obtained in step S3 as a binder comprises weighing the solid extract and raw coal in a certain proportion, and mixing to be uniform to obtain a mixture I, putting the mixture I into a hot-pressing mold; placing the hot-pressing mold in a high-temperature furnace, heating, and subjecting the mixture I to a heat preservation and a hot-pressing molding at a set pressure, and cooling to room temperature to obtain the hot-pressed coal briquette.

Based on any one of the possible implementations described above, embodiments are further provided as follows. A weight ratio value of the solid extract to the raw coal is in the range of 5-25%, and the hot-pressing molding is conducted at a temperature of 250-500° C., and the heat preservation is conducted for 10-60 min.

Based on any one of the possible implementations described above, embodiments are further provided as follows. The raw coal is one selected form the group consisting of bituminous coal and anthracite.

Based on any one of the possible implementations described above, embodiments are further provided as follows. In step S5, preparing a ceramsite by using the residue obtained in step S2 as a raw material comprises mixing raw materials alumina, bentonite and the residue to be uniform to obtain a mixture II; and subjecting the mixture II to a granulation, a pre-heating, and a high-temperature sintering to obtain a finished ceramsite product.

Based on any one of the possible implementations described above, embodiments are further provided as follows. The pre-heating is conducted at a temperature of 400-600° C. for 10-30 min, and the high-temperature sintering is conducted at a temperature of 900-1,200° C. for 10-60 min.

The present disclosure has the following beneficial effects. The present disclosure enables that the problems of difficult disposal and low utilization efficiency of the coal liquefaction residue are solved. The method has the advantages of simple operation, high disposal efficiency of the coal liquefaction residue and high added value of a product, thereby completely achieving the goal for recycling, reducing waste and harmless disposal of the coal liquefaction residue. An extraction rate of 70% for the coal liquefaction residue could be achieved. Most of polycyclic aromatic hydrocarbons are transferred to the solid extract, and the residue is essentially free of the polycyclic aromatic hydrocarbons. The binding performance of the extract is significantly improved, and the prepared hot-pressed coal briquette has high strength. The residue obtained has an ash content of not less than 30%, which is an ideal raw material for preparing the ceramsite.

BRIEF DESCRIPTION OF THE DRAWINGS

FIG. 1 shows a flow diagram of a method for recycling a coal liquefaction residue in an embodiment of the present disclosure.

DETAILED DESCRIPTION OF THE EMBODIMENTS

Specific examples of the present disclosure are described in detail below with reference to specific accompanying drawings. It should be noted that technical features or combinations thereof in the description of the following examples should not be regarded as isolated, and they could be combined with each other to achieve a better technical effect.

As shown in the FIGURE, a method for recycling a coal liquefaction residue in one embodiment of the present disclosure includes the following steps.

S1, a coal liquefaction residue is dried and then pulverized in an ore pulverizer, to obtain a pulverized coal liquefaction residue, wherein the coal liquefaction residue is a waste residue produced in a direct coal liquefaction process.

S2, the pulverized coal liquefaction residue is subjected to a solvothermal extraction in an autoclave to obtain an extract liquid and a residue.

S3, the extract liquid is distilled by using a rotary evaporator to obtain a solid extract, and an organic solvent evaporated out is recovered.

S4, a hot-pressed coal briquette is prepared by using the solid extract obtained in step S3 as a binder.

S5, a ceramsite is prepared by using the residue obtained in step S2 as a raw material.

Example 1

In this example, a method for recycling a coal liquefaction residue was performed as follows.

S1, a coal liquefaction residue was dried at 105° C. for 8 h first, and then pulverized to a particle size of not larger than 0.2 mm by using an ore pulverizer.

S2, 8 g of the coal liquefaction residue was weighed, and then put into a high-temperature reactor, together with 400 mL of N-methylpyrrolidone. Argon was introduced into the reactor to exhaust air in the reactor, and a gas inlet and a gas outlet were closed. The reactor was heated to 350° C., and a continuous stirring at a rate of 100 r/min was maintained by using a stirring paddle in a whole experiment process to ensure full contact between a solid phase and a liquid phase. The reactor was maintained at the temperature of 350° C. for 1 h, and a heating furnace was removed. The reactor was freely cooled to 50° C., and then, a solid-liquid mixture was taken out. Separation was conducted on the solid-liquid mixture by using a suction filtration device, obtaining a liquid phase and a filter residue.

S3, the filter residue was repeatedly rinsed with alcohol and deionized water to remove an organic solvent attached thereon. The liquid phase was introduced into a rotary evaporator to recover the N-methylpyrrolidone solvent and precipitate a solid product, in which a distillation was conducted at a temperature of 80° C. and a vacuum degree of less than 0.01 MPa. The solid product was repeatedly rinsed with alcohol and deionized water, and then dried in a drying oven at a temperature of 105° C. for 8 h (as well as the filter residue above).

S4, a hot-pressed coal briquette was prepared by using the solid extract (solid product) obtained in step S3 as a binder.

S5, a ceramsite was prepared by using the filter residue obtained in step S2 as a raw material.

Table 1 shows industrial analysis, elemental analysis and an extraction rate of samples. When the N-methylpyrrolidone is used, an extraction rate of about 70.8% for the coal liquefaction residue is achieved, showing an excellent extraction effect. According to industrial analysis results, the solid extract has a volatile content reaching 69.17 w %, which is higher than that of the coal liquefaction residue. Therefore, a large number of volatiles in the coal liquefaction residue are extracted. Since ash is insoluble in the organic solvent, the solid extract has a low ash content of only 0.72 w %, while the residue had a high ash content of 30.64%. Moreover, since most of sulfur in the coal liquefaction residue is transferred to the residue, the content of the sulfur in the solid extract is reduced to 0.09% from original 1.72%.

TABLE 1

| Sample | Industrial analysis/(wt %) | | | Elemental analysis/(wt %) | | | | | Extraction rate/(wt %) |
|---|---|---|---|---|---|---|---|---|---|
| | Volatile | Fixed carbon | Ash | Nitrogen | Carbon | Sulfur | Hydrogen | Oxygen | |
| Coal liquefaction residue | 44.54 | 43.74 | 11.72 | 0.82 | 78.78 | 1.72 | 4.56 | 2.40 | 70.8 |
| Solid extract | 69.17 | 30.11 | 0.72 | 2.78 | 85.14 | 0.09 | 5.81 | 4.03 | |
| Residue | 17.32 | 52.04 | 30.64 | 1.27 | 61.23 | 4.22 | 3.08 | 0.24 | |

Volatile components in the samples were detected by using gas chromatography-mass spectrometry analysis. Table 2 shows distribution rules of the volatile components in the samples. The volatile components in the coal liquefaction residue mainly consist of aromatic hydrocarbons and aromatic derivatives. Thus, the coal liquefaction residue is a dangerous solid waste. After the solvothermal extraction, most of the aromatic hydrocarbons are transferred to the solid extract. The volatile components in the extract mainly include aromatic hydrocarbons, aliphatic hydrocarbons, aromatic derivatives and few aliphatic derivatives. The volatile components in the residue mainly include 90.8% of aliphatic derivatives and a very low content of aromatic hydrocarbons and aromatic hydrocarbon derivatives. It indicates that the residue is basically harmless. In addition, due to a high content of ash and fixed carbon, the residue is an ideal raw material for preparing the ceramsite.

Due to excellent thermoplasticity at high temperature, the extract of the coal liquefaction residue could be used as a thermal binder to prepare a hot-pressed coal briquette in combination with ordinary pulverized coal. Table 3 shows industrial analysis and elemental analysis of raw coal used in this example. A method for preparing the hot-pressed coal briquette was performed as follows. First, the extract and the raw coal pulverized to a particle size of not larger than 0.5 mm were weighed in a certain proportion and mixed to be uniform. Then, 5 g of the uniform sample was put into a hot-pressing mold, and the mold was heated in a vertical high-temperature furnace at a set temperature. After a certain heating time, the sample was molded at a variable pressure of 0.1 kN/s, and when a set pressure (9.4 kN) was reached, the pressure was maintained for 1 min After the mold was cooled to room temperature, the sample was taken out.

TABLE 3

| Sample | Industrial analysis/(wt %) | | | Elemental analysis/(wt %) | | | | |
|---|---|---|---|---|---|---|---|---|
| | Volatile | Fixed carbon | Ash | Nitrogen | Carbon | Sulfur | Hydrogen | Oxygen |
| Sihe anthracite | 6.22 | 83.55 | 10.23 | 1.01 | 81.22 | 0.10 | 2.93 | 1.57 |

TABLE 2

| Sample | Aliphatic hydrocarbons, % | Aliphatic derivatives, % | Aromatic hydrocarbons, % | Aromatic derivatives, % |
|---|---|---|---|---|
| Coal liquefaction residue | 0 | 0 | 42.1 | 57.9 |
| Extract | 19.9 | 1.3 | 60.6 | 18.2 |
| Residue | 0 | 90.8 | 6.8 | 2.5 |

Table 4 shows characteristic parameters of hot-pressed coal briquettes prepared with different proportions of the extract of the coal liquefaction residue. When the proportion of the solid extract is zero, the hot-pressed coal briquette with a certain compressive strength could not be formed from pulverized anthracite even through the hot-pressing treatment. This is because a plastic substance could not be produced by the pulverized anthracite per se. When the proportion of the extract is increased, the compressive strength of the hot-pressed coal briquette is rapidly improved. It indicates that a large number of plastic substances are produced from the extract, which makes pulverized coal tightly bound under a mechanical pressure.

TABLE 4

| Temperature/° C. | Heating time/min | Proportion of extract/wt % | Height of coal briquette/cm | Mass of coal briquette/g | Compressive strength/N | Compressive strength/MPa |
|---|---|---|---|---|---|---|
| 450 | 30 | 0 | — | — | — | — |
| | | 5 | 1.25 | 5.0 | 173 | 0.44 |
| | | 10 | 1.24 | 4.9 | 440 | 0.56 |
| | | 15 | 1.21 | 4.8 | 629 | 1.65 |
| | | 20 | 1.18 | 4.6 | 691 | 1.86 |
| | | 25 | 1.14 | 4.4 | 597 | 1.67 |

Table 5 shows characteristic parameters of a hot-pressed coal briquette with different heating times. When the heating time is prolonged, the compressive strength of the hot-pressed coal briquette during hot-pressing is slightly reduced. It indicates that a plastic mass had great thermo-stability.

TABLE 5

| Proportion of extract/% | Temperature/° C. | Heating time/min | Height of coal briquette/cm | Mass of coal briquette/g | Compressive strength/N | Compressive strength/MPa |
|---|---|---|---|---|---|---|
| 15 | 450 | 10 | 1.25 | 5.0 | 679 | 1.73 |
|  |  | 20 | 1.24 | 4.9 | 657 | 1.69 |
|  |  | 30 | 1.21 | 4.8 | 629 | 1.65 |
|  |  | 40 | 1.21 | 4.8 | 593 | 1.56 |
|  |  | 50 | 1.20 | 4.8 | 578 | 1.53 |

Table 6 shows characteristic parameters of a hot-pressed coal briquette at different heating temperatures. The compressive strength of the hot-pressed coal briquette could reach 2.52 MPa (959 N), with a heating temperature of 350° C. Therefore, the hot-pressed coal briquette with high strength could be prepared by using the extract of the coal liquefaction residue as a binder and pulverized anthracite as a raw material.

TABLE 6

| Proportion of extract/% | Heating time/min | Temperature/° C. | Height of coal briquette/cm | Mass of coal briquette/g | Compressive strength/N | Compressive strength/MPa |
|---|---|---|---|---|---|---|
| 15 | 30 | 250 | 1.23 | 4.9 | 579 | 1.50 |
|  |  | 300 | 1.21 | 4.9 | 708 | 1.86 |
|  |  | 350 | 1.21 | 4.9 | 959 | 2.52 |
|  |  | 400 | 1.21 | 4.9 | 795 | 2.00 |
|  |  | 450 | 1.21 | 4.8 | 629 | 1.65 |
|  |  | 500 | 1.19 | 4.7 | 596 | 1.59 |
|  |  | 550 | 1.16 | 4.6 | 514 | 1.41 |

Table 7 shows characteristic parameters of a hot-pressed coal briquette prepared by directly using the coal liquefaction residue as a binder at different heating temperatures. Compared with the coal liquefaction residue, the binding performance of the extract of the coal liquefaction residue is greatly improved, and the compressive strength of the hot-pressed coal briquette prepared with the same is improved by not less than 50%. Therefore, by using this method, the binding performance of the extract of the coal liquefaction residue could be significantly improved.

TABLE 7

| Proportion of coal liquefaction residue/% | Heating time/min | Temperature/° C. | Height of coal briquette/cm | Mass of coal briquette/g | Compressive strength/N | Compressive strength/MPa |
|---|---|---|---|---|---|---|
| 15 | 30 | 250 | 1.28 | 4.9 | 360 | 0.90 |
|  |  | 300 | 1.28 | 4.9 | 491 | 1.22 |
|  |  | 350 | 1.25 | 4.9 | 639 | 1.63 |
|  |  | 400 | 1.25 | 4.9 | 470 | 1.20 |
|  |  | 450 | 1.25 | 4.9 | 466 | 1.19 |
|  |  | 500 | 1.25 | 4.9 | 456 | 1.16 |
|  |  | 550 | 1.18 | 4.7 | 266 | 0.72 |

Example 2

According to a traditional method for preparing a coal briquette, a cold-pressing molding has been generally used, and a binder used mainly includes an inorganic binder, an organic binder and a composite binder. In order to be illustrate the advantages of a hot-pressed coal briquette prepared from the extract of the coal liquefaction residue, cold-pressed coal briquettes were prepared by using three traditional binders such as bentonite, starch and molasses according to the following methods respectively.

The method for preparing a bentonite-type coal briquette was performed as follows. Water addition and batching were conducted at the same time. First, 0.75 g of deionized water (with a mass fraction of 15%) was weighed by using a balance and added into a stirrer. Then, the bentonite and pulverized coal in different proportions with a total mass of 4.25 g were weighed and thoroughly mixed in the stirrer. The uniform samples after mixing were put into a mold and molded at a variable pressure of 0.1 kN/s. When a set pressure (9.4 kN) was reached, the pressure was maintained for 1 min. The samples were taken out. Pressed coal briquettes were dried in a drying oven at 105° C. for 4 h, put into sealed bags and numbered.

The method for preparing a starch-type coal briquette was performed as follows. Since the starch had cohesiveness after gelatinization in hot water, excess starch was dissolved in the hot water at 95° C. and continuously stirred for gelatinization, obtaining a transparent solution. The transparent solution was cooled to room temperature. Then, the solution and pulverized coal in different proportions with a total mass of 5 g were weighed and thoroughly mixed in a stirrer. The uniform samples after mixing were put into a mold and molded at a variable pressure of 0.1 kN/s. When a set pressure (9.4 kN) was reached, the pressure was maintained for 1 min. The samples were taken out. Pressed coal briquettes were dried in a drying oven at 105° C. for 4 h, put into sealed bags and numbered.

The method for preparing a molasses-type coal briquette was performed as follows. Due to too high viscosity, the molasses was difficult to mix, thereby not facilitating molding of the coal briquette. Therefore, the molasses was diluted with deionized water at a volume ratio of 1:1, obtaining a solution. The solution and pulverized coal in different proportions with a total mass of 5 g were weighed and thoroughly mixed in a stirrer. The uniform samples after mixing were put into a mold and molded at a variable pressure of 0.1 kN/s. When a set pressure (9.4 kN) was reached, the pressure was maintained for 1 min. The samples were taken out. Pressed coal briquettes were dried in a drying oven at 105° C. for 4 h, put into sealed bags and numbered.

TABLE 8

| | Proportion of bentonite/by weight | | | | | | |
|---|---|---|---|---|---|---|---|
| | 0 | 5% | 10% | 15% | 20% | 25% | 30% |
| Compressive strength/N | 19 | 48 | 64 | 85 | 128 | 105 | 100 |

TABLE 9

| | Proportion of starch/by weight | | | | | |
|---|---|---|---|---|---|---|
| | 0 | 5% | 10% | 15% | 20% | 25% |
| Compressive strength/N | 19 | 50 | 120 | 141 | 110 | 109 |

TABLE 10

| | Proportion of molasses/by weight | | | | | | |
|---|---|---|---|---|---|---|---|
| | 0 | 5% | 10% | 15% | 20% | 25% | 30% |
| Compressive strength/N | 19 | 63 | 158 | 403 | 283 | 275 | 267 |

The compressive strength of the three kinds of cold-pressed coal briquettes are shown in Table 8, Table 9 and Table 10 respectively. It can be seen that when the bentonite is added in a proportion of 20%, the coal briquette had a maximum compressive strength of 128 N. When the starch is added in a proportion of 15%, the coal briquette has a maximum compressive strength of 141 N. When the molasses is added in a proportion of 15%, the coal briquette has a compressive strength of 403 N. However, when the bentonite is used, the ash content of the coal briquette is increased. When the starch and the molasses are used, the water resistance and the thermal intensity are low. In addition, since the water is added, difficult mixing is caused, and properties of the prepared coal briquette are unstable. As a contrast, the hot-pressed coal briquette prepared by using the extract of the coal liquefaction residue as a binder had a maximum compressive strength of 959 N, which is far higher than that of the cold-pressed coal briquettes prepared with the three binders. Moreover, the hot-pressed coal briquette according to the present disclosure had stable properties and incomparable advantages over the coal briquettes prepared with the traditional binders.

As an important innovation of the present disclosure, a high-efficiency coal briquette binder, namely the solid extract of the present disclosure, is produced during the recycling disposal of the coal liquefaction residue. In order to understand the innovation of the present disclosure more accurately, following supplementary explanations of a coal briquette technology are made.

I. Necessity of Developing a Coal Briquette Technology

Coal resources in China have the following two characteristics. First, pulverized coal has a high yield, and lump coal has a low yield. With increase of a mechanical recovery rate in the coke industry, the yield of the lump coal has been reduced from 40% to about 10% in recent years, and the yield of the pulverized coal is about 90%. Since the production of the lump coal is gradually reduced, the lump coal is in short supply on the market, and the price of the lump coal is continuously increased. However, the pulverized coal has a large backlog and a low price, and certain environmental pollution is caused by the large backlog and direct combustion. Second, the overall coal resources are low in quality, and there are few high-quality coal resources. Coal reserves with a raw coal ash content of less than 10% only account for 15%-20% of retained reserves. Coal reserves with a sulfur content of greater than 1.5% account for about 30% of the retained reserves. Low-quality coal, such as lignite, raw coal with a medium and high content of sulfur and raw coal with a high content of ash, accounts for about 40% of the total coal resources. Among special coal, fat coal and coking coal account for less than 10%, and lean coal and anthracite account for about 15%. Therefore, development of a coal briquette technology is an important way to solve the problems above. As a coal product with certain shape and strength, a coal briquette is formed by processing one or several kinds of pulverized coal and a certain proportion of a binder or a sulfur-fixing agent under a certain pressure. Compared with raw coal for direct use, the coal briquette has the following advantages.

(1) A large amount of the pulverized coal is used to reduce the demand for the lump coal.

At present, the lump coal in China is in a large demand and in short supply. The lump coal needs to be used in industrial boilers and kilns in China, a large part of which involves stratified combustion, and in the production of synthetic gas and fuel gas in the chemical fertilizer industry in China. By developing the industrial coal briquette, the situation that the lump coal is low in quantity and is in short supply could be alleviated, and a technical approach is provided for rational and effective utilization of the pulverized coal.

(2) The combustion efficiency is improved, and energy waste is reduced.

As a main coal briquette for civilian use in China, a honeycomb briquette when equipped with an advanced stove could achieve a thermal efficiency honeycomb briquette 1 times higher than that of scattered coal. According to various coal cleaning technologies, the industrial coal briquette has the highest energy conversion rate of 97.5%, which is far greater than that of other technologies. Since a coal briquette product for a boiler has a large particle size, gaps required for combustion can be ensured. The combustion efficiency is high, and little coal is exposed. Compared with raw coal for combustion, 15%-20% of the coal could be saved.

(3) Environmental pollution is reduced.

Atmospheric pollution could be greatly reduced by combusting the coal briquette in the boilers. Compared with the raw coal for combustion, $SO_2$ emissions are reduced by about 40%-60%, $NO_2$ emissions are reduced by about 40%, soot emissions are reduced by about 60%, and strong carcinogens are reduced by not less than 50%. Thus, an obvious environmental protection effect is achieved. By adding a sulfur-fixing agent and a binder in the processing process of coal briquette, the $SO_2$ emissions could be reduced by 40%-50%, and solid dust emissions could also be reduced. In addition, the coal briquette could be prepared by using an industrial waste and an agricultural waste as a binder to turn waste into treasure, thereby reducing discharge of three wastes.

(4) Property defects of single coal are reduced.

During the processing and manufacturing of the coal briquette, by using an additive and combining and blending coals with different properties, indicators, such as cohesiveness index, ignition point, ash, ash melting point, sulfur, fixed carbon, volatile and calorific value, are improved. The reactivity, flammability and thermostability of the coal are improved, the ash melting point is increased, and high-quality products with indicators meeting requirements of customers are produced. For example, formed coke could be prepared from non-coking coal through coal blending to serve as a substitute for metallurgical coke. An anthracite briquette could be prepared from bituminous coal to replace gas-making anthracite lump coal. As a result, utilization ways of the coal are expanded.

II. Necessity of Coking with Weakly Caking Coal

The cohesiveness of the coal refers to the ability of the bituminous coal to bind itself or an added inert substance during dry distillation. The cohesiveness is used as a standard for measuring the ability that the bituminous coal is softened and melt and then a plastic mass is formed and solidified during dry distillation, and is also a primary condition for coking of the coal. The quantity and quality of the plastic mass formed are main indicators for determining the cohesiveness of the coal. A liquid phase in the plastic mass is mainly formed by heating macromolecular side chains and functional groups. Coal with a low metamorphism degree (such as lignite and long-flame coal) has a low content of carbon in a coal structure, a loose structure, more outer side chains of an aromatic core and a high oxygen content; at a certain temperature, the coal has a high content of a gas phase and a low content of a stable liquid phase, which hinders the formation of the plastic mass, thereby resulting in low cohesiveness. Coal with a high metamorphism degree (such as lean coal and meager lean coal) has a low content of oxygen while a low content of side chains, and thus it is difficult to form a liquid phase, thereby resulting in low cohesiveness. Therefore, strongly caking bituminous coal (such as fat coal and coking coal) is in a high demand in a coking process.

As an important raw material for blast furnace smelting, coke is essential to blast furnace production and is meanwhile used as a molten iron carburizing agent, an exothermic agent, a reducing agent and a stock column skeleton in a blast furnace. The coke is an industrial product produced by conducting coking on coking coal in a coking oven. However, a pollution problem caused by the coking process has been criticized. A large amount of dust, waste gas and sewage are produced in the coking process, and serious pollution and damage are caused to the environment. China is a country with mass production and high consumption of the coke, and a large amount of the coking coal is consumed every year. However, coking coal resources are not rich in China. Reserves of the coking coal only account for 26% of total reserves of the coal resources, and reserves of the strongly caking fat coal and coking coal only account for 10% of the reserves of the coking coal. Since the coking coal is in an increasing demand, the strongly caking bituminous coal is gradually in short supply, and its price is continuously increased. Moreover, the quality of the raw coal supplied is gradually reduced, and as a result, the quality of the coking coal, which previously has a high content of sulfur and ash, is worse. In contrast, weakly caking coal (such as anthracite, meagre coal, lean coal and semi-coke) has great quality and a low price. Especially since 2010, China has paid great efforts to clean up traditional coking kilns, and a large number of coking enterprises not satisfying production standards are shut down. Therefore, development of an unconventional coking process and increase of the proportion of the weakly caking coal have become important means for the coking enterprises to reduce the cost.

III. Purpose and Significance of Preparing a Hot-Pressed Coal Briquette

An extract obtained from the coal liquefaction residue by solvent extraction has not only a very low ash content, but also excellent cohesiveness. A hot-pressed coal briquette prepared by using the extract of the coal liquefaction residue as a thermal binder with weakly caking pulverized coal has high mechanical strength. Since anthracite is used as a raw material, the reactivity is also very low. However, the coke used in the blast furnace generally requires low reactivity and high post-reaction strength. Therefore, the hot-pressed coal briquette could not only be used as a general lump fuel, but also replace the coke in the blast furnace. Compared with a traditional coking process, the hot-pressed coal briquette is produced at a low temperature, and the coking process is not required, thereby reducing energy consumption and environmental pollution. By using this method, not only the use value of the coal liquefaction residue could be improved, but also the utilization rate of the weakly caking pulverized coal could be increased; excessive dependence on the coking coal resources is reduced, and thus the method according to the present disclosure is of great significance to energy conservation and emission reduction of iron and steel enterprises.

As can be seen, it is of great practical significance for production of a coal briquette to use the solid extract extracted in the present disclosure as a coal briquette binder. Also, the method according to the present disclosure has the advantages of simple operation, high disposal efficiency of the coal liquefaction residue, and high added value of a product, thereby completely achieving the goal for recycling, reducing waste and harmless disposal of the coal liquefaction residue.

Although some embodiments of the present disclosure have been described in this specification, it will be understood by those skilled in the art that changes may be made to the embodiments in this specification without departing from the spirit of the present disclosure. The foregoing embodiments are exemplary and shall not be construed as a limitation to the scope of the present disclosure.

What is claimed is:

1. A method for recycling a coal liquefaction residue, comprising:
    drying a coal liquefaction residue and pulverizing the dried coal liquefaction residue to obtain a pulverized coal liquefaction residue, the coal liquefaction residue comprising a waste product generated by a direct coal liquefaction process;
    subjecting the pulverized coal liquefaction residue to a solvothermal extraction in an autoclave to obtain an extract liquid and a residue; and
    distilling the extract liquid and recovering an organic solvent to obtain a solid extract.

2. The method as claimed in claim 1, wherein a solvent for the solvothermal extraction is N-methylpyrrolidone, and the solvothermal extraction is conducted at a temperature of 300-400° C. for 0.5-1.5 h.

3. The method as claimed in claim 1, wherein the coal liquefaction residue is dried at a temperature of 80-120° C. and pulverized to a particle size of less than or equal to 0.2 mm.

4. The method as claimed in claim 1, wherein the distilling is conducted at a temperature of 80-110° C. and a vacuum degree of less than or equal to 0.05 Mpa.

5. The method as claimed in claim 1, further comprising preparing a hot-pressed coal briquette using the solid extract as a binder, wherein the preparation of the hot-pressed coal briquette comprises:
   mixing amounts of the solid extract and raw coal to obtain a first mixture; delivering the first mixture into a hot-pressing mold;
   placing the hot-pressing mold in a high-temperature furnace;
   heating the hot-pressing mold, and subjecting the first mixture to heat preservation and hot-pressing molding at a set pressure; and
   cooling the hot-pressing mold to room temperature to obtain the hot-pressed coal briquette.

6. The method as claimed in claim 5, wherein a weight ratio value of the solid extract to the raw coal is in the range of 5-25%, and the hot-pressing molding is conducted at a temperature of 250-500° C., and the heat preservation is conducted for 10-60 min.

7. The method as claimed in claim 5, wherein the raw coal is selected from the group consisting of bituminous coal and anthracite.

8. The method as claimed in claim 1, further comprising preparing a ceramsite using the residue obtained after subjecting the pulverized coal liquefaction residue to the solvothermal extraction in the autoclave as a raw material, wherein the preparation of the ceramsite comprises:
   mixing alumina, bentonite and the residue obtained after subjecting the pulverized coal liquefaction residue to the solvothermal extraction in the autoclave to obtain a second mixture; and
   subjecting the second mixture to granulation, pre-heating, and high-temperature sintering to obtain a finished ceramsite product.

9. The method as claimed in claim 8, wherein the pre-heating is conducted at a temperature of 400-600° C. for 10-30 min, and the high-temperature sintering is conducted at a temperature of 900-1,200° C. for 10-60 min.

* * * * *